UNITED STATES PATENT OFFICE.

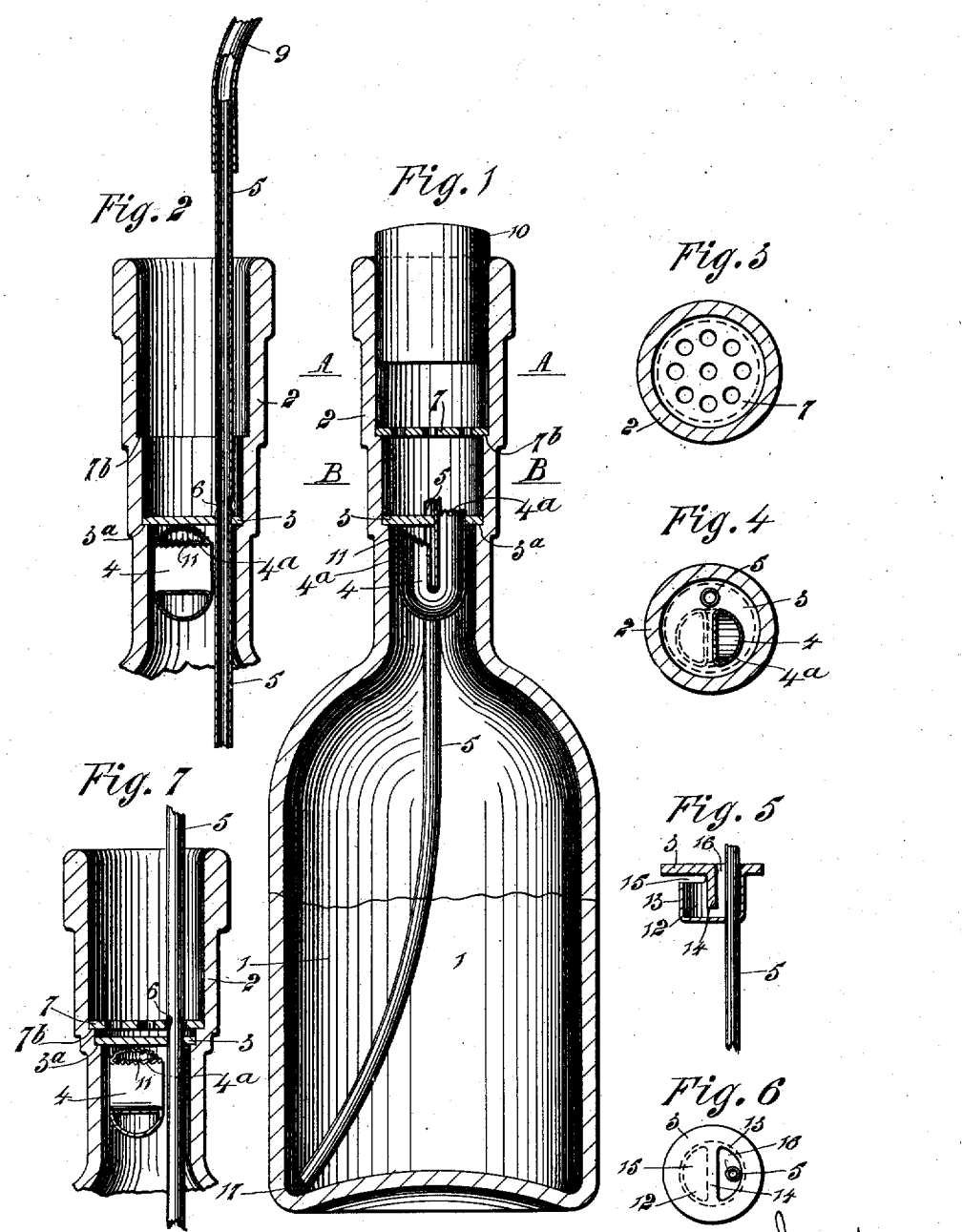

CHARLES JOSEPH COOZE, OF CARTERTON, NEW ZEALAND.

NON-REFILLABLE BOTTLE.

SPECIFICATION forming part of Letters Patent No. 654,230, dated July 24, 1900.

Application filed October 4, 1899. Serial No. 732,475. (No model.)

*To all whom it may concern:*

Be it known that I, CHARLES JOSEPH COOZE, a subject of the Queen of Great Britain, and a resident of Carterton, in the provincial district of Wellington, in the Colony of New Zealand, have invented certain new and useful Improvements in Non-Refillable Bottles, of which the following is a specification.

The object of this invention is to provide a cheap and simple bottle which cannot be refilled after its original contents have been poured out. To this end I fit a glass disk into the neck of the bottle and provide the disk with a trap formed by bending a piece of tubing into a U shape or by making a bowl with a partition, so that liquid may flow into the tube or bowl to the other side of the disk. A tube of small diameter extends above the neck and downward through the said disk to the bottom of the bottle, and immediately above the disk it is weakened by attenuation, so that it may be readily broken off. After the tube has been thus broken off a perforated disk is fitted into the neck of the bottle above the first-mentioned disk.

The accompanying drawings illustrate the invention.

Figure 1 is a section of a bottle fitted with my improvements as they appear after the bottle has been filled. Fig. 2 is a section of the neck, showing the parts as they appear before the bottle has been filled. Fig. 3 is a section on the line A A, Fig. 1. Fig. 4 is a section on the line B B, Fig. 1. Fig. 5 is a section of the trap when made as a bowl. Fig. 6 is a plan of the same. Fig. 7 shows an alternative position for the disk.

Similar figures of reference indicate corresponding parts where they occur in the several views.

1 is the body of the bottle; 2, the neck; 3, a glass disk cemented in the neck; 4, a trap made by bending a piece of glass tubing to the shape shown.

5 is a tube of small diameter (shown in Fig. 2) extending above the neck of the bottle and weakened at the part 6, so that it may be readily broken off, as shown in Fig. 1.

7 is a perforated disk cemented in the neck. Shoulders 3ª and 7ᵇ are made in the neck to form a seat whereon the disks 3 and 7, respectively, may be cemented.

The bottle is filled by attaching an india-rubber tubing 9 upon the tube 5, as shown on Fig. 2, which tube is connected to an air-pump or a vessel exhausted of air. The bottle is then inverted, so that the neck is downmost, and in this position the mouth of the neck is immersed in a quantity of the liquid with which it is desired to fill the bottle. The air is exhausted from the body 1 of the bottle and is replaced by the liquid until the bottle is full. The neck is then lifted out of the liquid, the bottle turned with its neck uppermost, the india-rubber tube 9 removed, the glass tube 5 broken off at the part 6, the disk 7 cemented in position, and the cork 10 inserted in any ordinary manner, as shown by Fig. 1.

The liquid may be poured out after the cork has been drawn and the bottle tilted in the ordinary way, since the liquid will pass out through the trap 4 and air will enter through the broken tube 5; but it is impossible to refill the bottle, and an attempt to do so would choke the trap and tube 5 with liquid and prevent the air contained in the bottle from escaping.

Fig. 7 shows the disk and the attenuation 6 in the same plane. With this form the perforated disk 7 may be fixed before the bottle is filled and the tube broken off afterward, as previously described.

The perforated disk 7 is for the purpose of preventing tampering with the tube 5 or the trap 4, and as a further precaution against tampering the rims of the trap 4 have serrations 4ª.

The inner end of the trap 4 is sloped, as shown, so that the liquid may freely pass out while the tip 11 is kept close to the disk 3.

On Figs. 5 and 6 the trap 12 has a bowl 13 and partition 14 attached to or integral with the disk 3 and with an inlet 15 and outlet 16 for the liquid.

I prefer to bend the tube 5 to carry its lower end 17 near to the side and at the bottom of the bottle, as shown on Fig. 1, as by this arrangement the tilting of the bottle is reduced as much as possible to make the liquid flow through the trap, for the bottle must be tilted far enough to bring the surface of the liquid below the lower end 17 of the tube 5.

Having now particularly described and ascertained the nature of my said invention and in what manner the same is to be performed, I declare that what I claim is—

A non-refillable bottle having its neck provided with two internal shoulders, a disk supported on the lower shoulder, a trap suspended from said disk composed of a U-shaped body having a longer leg extending up through the disk and a shorter leg terminating underneath the disk, serrations on the ends of said legs, a tube passing through said disk, extending to the lower part of the bottle and rising above the mouth thereof, and provided with a weakened portion just above said disk, and a perforated disk adapted to rest on the upper shoulder in the bottle-neck.

In witness whereof I have hereunto set my hand in presence of two witnesses.

CHARLES JOSEPH COOZE.

Witnesses:
 IVY W. BARRAUD,
 B. E. HUGHES.